United States Patent [19]

Imaino et al.

[11] Patent Number: 5,373,499
[45] Date of Patent: Dec. 13, 1994

[54] MULTILAYER OPTICAL DISK AND SYSTEM HAVING MULTIPLE OPTICAL PATHS INCLUDE IDENTICAL TOTAL DISK SUBSTRATE THICKNESS

[75] Inventors: Wayne I. Imaino, San Jose; Hal J. Rosen, Los Gatos; Kurt A. Rubin, Santa Clara; Timothy C. Strand, San Jose, all of Calif.

[73] Assignee: International Business Machines Corporation, Armonk, N.Y.

[21] Appl. No.: 96,585

[22] Filed: Jul. 22, 1993

[51] Int. Cl.⁵ .......................... G11B 7/26; G11B 7/20
[52] U.S. Cl. ................................ 369/275.4; 369/94; 369/275.1
[58] Field of Search ................. 369/44.32, 94, 109, 369/110, 283, 286, 275.4, 112

[56] References Cited

U.S. PATENT DOCUMENTS

| | | | |
|---|---|---|---|
| 3,946,367 | 3/1976 | Wohlmut et al. | 369/94 |
| 4,219,704 | 8/1980 | Russell | 369/108 |
| 4,450,553 | 5/1984 | Holster et al. | 369/275.1 |
| 4,905,215 | 2/1990 | Hattori et al. | 369/110 |
| 4,908,813 | 3/1990 | Ojima et al. | 369/94 |
| 5,063,556 | 11/1991 | Chikuma | 369/112 |
| 5,202,875 | 4/1993 | Rosen et al. | 369/94 |
| 5,251,198 | 10/1993 | Strickler | 369/110 |
| 5,255,262 | 10/1993 | Best et al. | 369/275.1 |

FOREIGN PATENT DOCUMENTS

| | | | |
|---|---|---|---|
| 1078060 | 5/1980 | Canada | 352/32 |
| 0461956 | 12/1991 | European Pat. Off. | G11B 7/00 |
| 60-202545 | 10/1985 | Japan | G11B 7/00 |
| 62-271236 | 11/1987 | Japan | G11B 7/14 |
| 63-276732 | 11/1988 | Japan | G11B 13/00 |
| 3116548 | 5/1991 | Japan | G11B 7/09 |

OTHER PUBLICATIONS

N. K. Arter et al., "Optical Disk Family", IBM Technical Disclosure Bulletin, vol. 30, No. 2, Jul. 1987, pp. 667–669.

Primary Examiner—Paul M. Dzierzynski
Assistant Examiner—Kim-Kwok Chu
Attorney, Agent, or Firm—Thomas R. Berthold

[57] ABSTRACT

An optical data storage system uses an optical medium made of a stack of spaced-apart optical disks. Each disk in the stack is made of light-transmissive material, such as polycarbonate when the system is a CD-ROM system, and has a partially light-transmissive data layer on at least one of its faces. A focusing lens in the system focuses light to the data layers along optical paths, with each data layer corresponding to a unique optical path length. The light is focused to each data layer by reflection off adjacent data layers such that the total substrate thickness through which the light passes is the same for each optical path. In this manner, the fixed spherical aberration correction provided by the focusing lens is adequate and variable aberration correction is not necessary. By appropriate selection of reflectivities of the multiple data layers in the disk stack, it is possible to design the system so that the effective reflected light intensity from each data layer is the same, and that adjustable signal amplification is not necessary.

16 Claims, 5 Drawing Sheets

MULTILAYER OPTICAL DISK AND SYSTEM HAVING MULTIPLE OPTICAL PATHS INCLUDE IDENTICAL TOTAL DISK SUBSTRATE THICKNESS

TECHNICAL FIELD

This invention relates generally to optical data storage media and systems, and more specifically to optical media with multiple disk surfaces and storage systems using such media.

BACKGROUND OF THE INVENTION

Optical data storage systems provide a means for storing great quantities of data on a disk. The data is accessed by focusing a laser beam onto the data layer of the disk and then detecting the reflected light beam. Various kinds of systems are known. In a ROM (Read Only Memory) system, such as a compact disk system (CD-ROM), data is permanently embedded as marks in the disk at the time of manufacture of the disk. The data is detected as a change in reflectivity as the laser beam passes over the data marks. A WORM (Write-Once Read-Many) system allows the user to write data by making marks, such as pits, on a blank optical disk surface. Once the data is recorded onto the disk it cannot be erased. The data in a WORM system is also detected as a change in reflectivity. There are also erasable optical data storage systems, such as phase change and magneto-optic (M-O) systems. While phase change systems also read data by sensing a change in reflectivity, M-O systems read data by measuring the rotation of the incident polarization caused by the M-O) media.

To increase the storage capacity of an optical disk, multiple data layer systems have been proposed. An optical disk having two or more data layers may be accessed at different layers by changing the focal position of the lens. One example of this type of system is described in U.S. Pat. No. 5,202,875 assigned to IBM. In such systems, the light from the laser source must pass through one or more of the light-transmissive disk substrates in order to access the data layers on the different substrates. The focusing of the light through a relatively thick substrate introduces spherical aberration into the light beam. In the case of conventional single-disk optical systems, this can be corrected by slightly changing the curvature of the focusing lens by a fixed amount because the amount of substrate material through which the light must pass remains fixed. However, in multiple data layer optical disk systems, because the light is required to be focused through different numbers and thicknesses of substrates, depending on which data layer is being accessed, some form of adjustable active compensation for spherical aberration is required.

SUMMARY OF THE INVENTION

The invention is an optical disk medium made of a stack of spaced-apart optical disks, and an optical disk storage system using the medium. Each disk in the stack is made of light-transmissive material, such as polycarbonate when the system is a CD-ROM system, and has a partially light-transmissive data layer on at least one of its faces. A focusing lens in the system focuses light to the data layers along optical paths, with each data layer corresponding to a unique optical path length. However, the light is focused to each data layer by reflection off adjacent data layers such that the total substrate thickness through which the light passes is the same for each optical path. In this manner, the fixed spherical aberration correction provided by the focusing lens is adequate and variable aberration correction is not necessary. By appropriate selection of reflectivities of the multiple data layers in the disk stack, it is possible to design the system so that the effective reflected light intensity from each data layer is the same, and that adjustable signal amplification is not necessary.

For a fuller understanding of the nature and advantages of the present invention, reference should be made to the following detailed description taken in conjunction with the accompanying figures.

DESCRIPTION OF THE PREFERRED EMBODIMENTS

Figure 1:
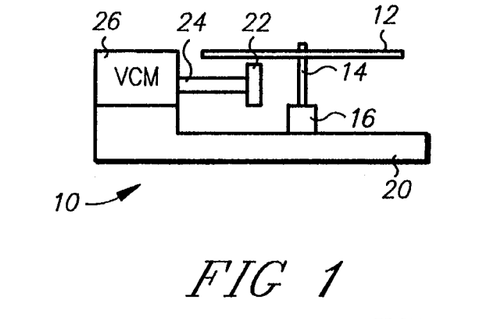
FIG. 1 is a schematic diagram of an optical disk storage system of the present invention in the form of a CD-ROM system.

FIG. 1 shows a schematic diagram of an optical disk storage system designated by the general reference number 10. System 10 will be explained in terms of a CD-ROM optical system. System 10 includes an optical data storage medium 12 which is preferably disk shaped and removably mounted on a clamping spindle 14 as is known in the art. Spindle 14 is attached to a spindle motor 16, which in turn is attached to a system chassis 20. Motor 16 rotates spindle 14 and medium 12.

An optical head 22 is positioned below medium 12. Head 22 is attached to an arm 24, which in turn is connected to an actuator device such as a voice coil motor 26. Voice coil motor 26 is attached to chassis 20 and moves arm 24 and head 22 in a radial direction below medium 12.

Figure 2:
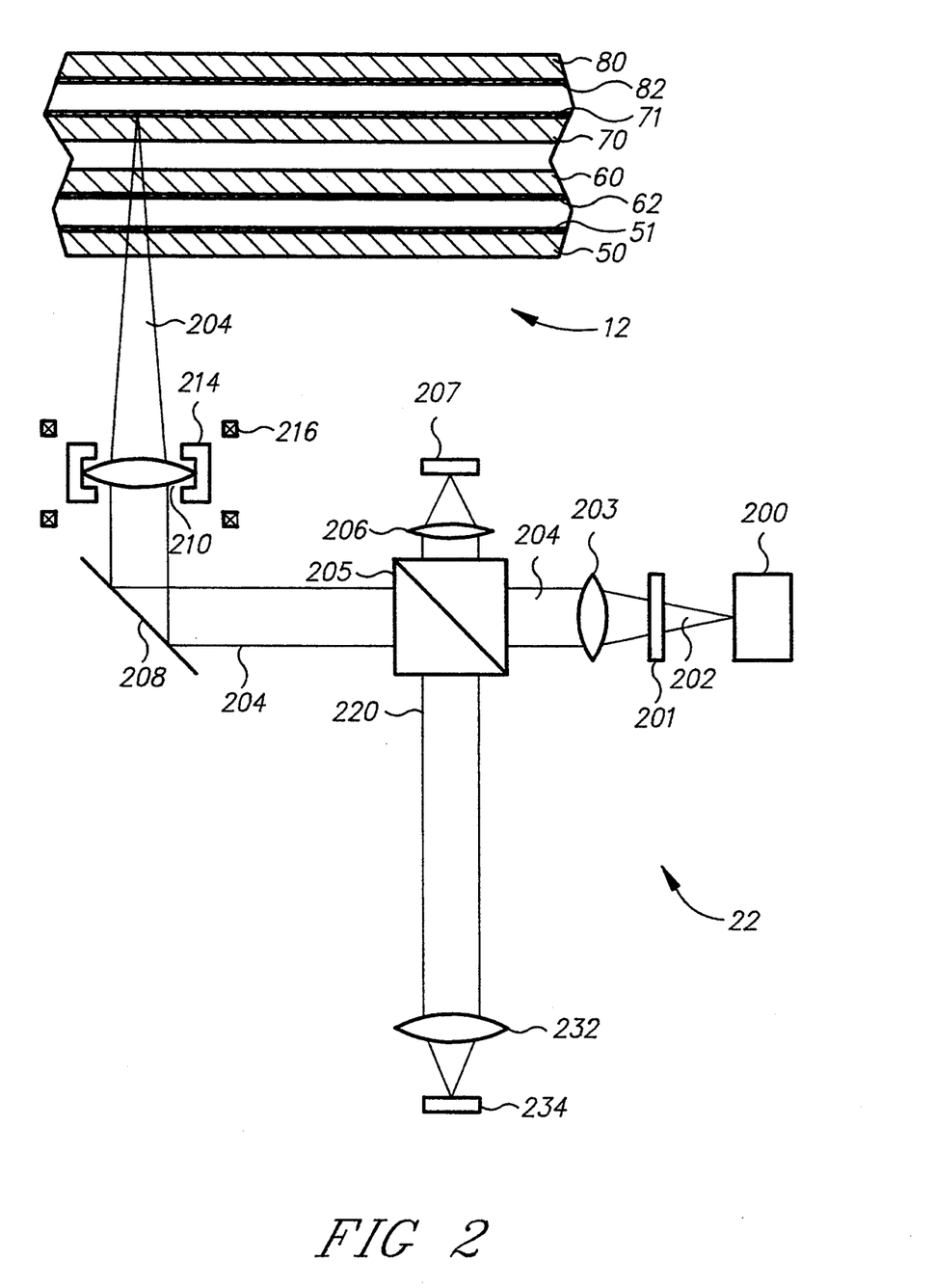
FIG. 2 is a schematic diagram of the optical head and medium of the present invention illustrating the means for detecting and amplifying light reflected at different intensities from the respective data layers.

FIG. 2 shows a schematic diagram of one embodiment of the optical head 22 and medium 12 of FIG. 1. Optical head 22 includes a laser diode 200, which may be a gallium-aluminum-arsenide diode laser producing a primary beam of light 202 at approximately 780 nanometers wavelength. Beam 202 is first diffracted by grating 201 to produce two secondary beams for tracking, in addition to the primary data beam, and then collimated by lens 203. The resulting three-component beam 204 then passes to a beamsplitter 205. A portion of beam 204 is reflected by beamsplitter 205 to a focus lens 206 and an optical detector 207. Detector 207 is used to monitor the power of laser beam 204. Beam 204 from beamsplitter 205 next passes to and is reflected by a mirror 208. Beam 204 then passes through a focus lens 210 and is focused onto one of the data surfaces (surface 71 of substrate 70 as shown) of medium 12. Lens 210 is mounted in a holder 214, the position of which is adjusted relative to medium 12 by a focus actuator motor 216, which may be a voice coil motor.

A portion of the light beam 204 is reflected at the data surface 71 as a reflected beam 220. Beam 220 returns through lens 210 and is reflected by mirror 208. At beamsplitter 205, beam 220 is directed through an astigmatic lens 232 and onto a multielement optical detector 234.

Figure 3:
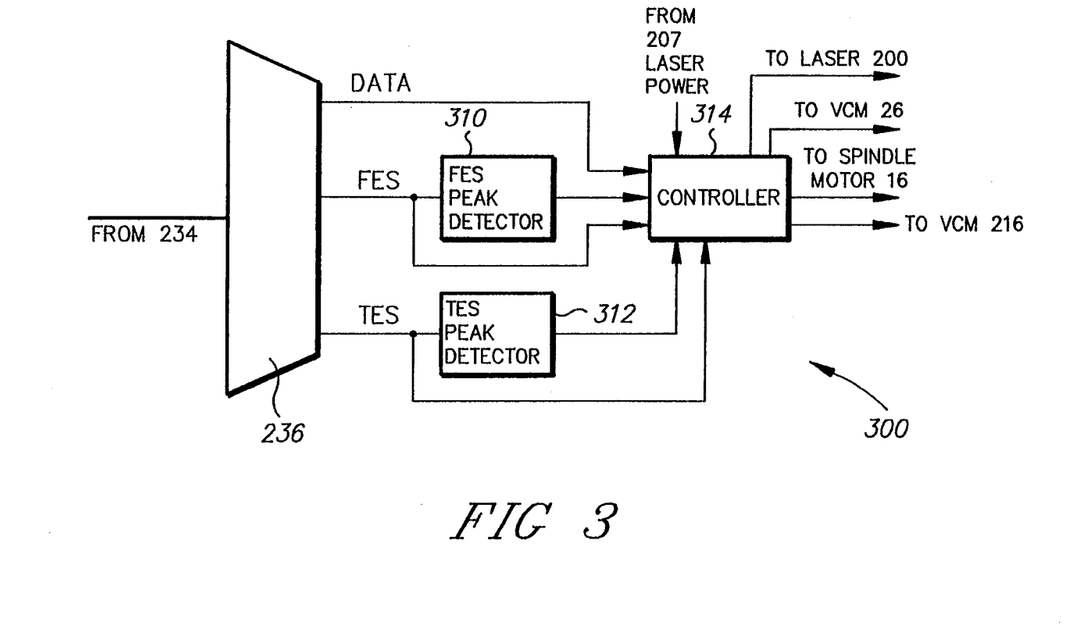
FIG. 3 is a block diagram of a controller system of the present invention.

FIG. 3 is a block diagram of a controller system of the present invention and is designated by the general reference number 300. A focus error signal (FES) peak detector 310 receives a focus error signal (FES), and a tracking error signal (TES) peak detector 312 receives a tracking error signal (TES). The multielement detector 234 (FIG. 2) generates output signals that are amplified by signal amplifier 236 and used to generate the data signal, the tracking error signal (TES), and the focus error signal (FES), each of which is sent to controller 314. Controller 314 also receives input signals from FES peak detector 310, TES peak detector 312, and laser power detector 207. Controller 314 is a microprocessor-based disk drive controller. Controller 314 is also connected to and controls the laser 200, head motor 26, spindle motor 16, and focus motor 216.

The operation of optical storage system 10 (FIG. 1) may now be understood with reference to FIGS. 2 and 3. Controller 314 controls motor 16 that rotates disk 12 and motor 26 that moves optical head 22 to the proper position below disk 12. Laser 200 is energized to read data from medium 12. The beam 204 is focused by lens 210 on the appropriate data surface. The reflected beam 220 returns and is directed to the multielement detector 234 by the astigmatic lens 232. The TES, FES, and data signals are output by detector 234 and amplified by amplifier 236 (FIG. 3).

Figure 4:
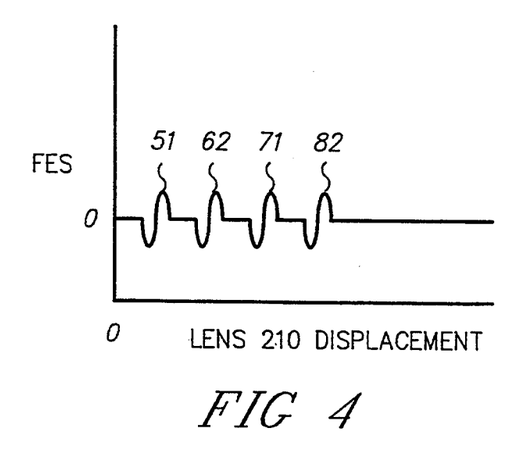
FIG. 4 is a graph of the focus error signal (FES) versus lens displacement for the present invention.

FIG. 4 shows a graph of the FES versus the displacement distance of lens 210. Note that a nominally sinusoidal focus error signal is obtained for each of the data surfaces of medium 12 when the aberrations introduced by the substrates are properly compensated. Between the data layers, the FES is zero. During startup of the system, controller 314 first causes motor 216 to position lens 210 at its zero displacement position. Controller 314 will then seek the desired data surface by causing motor 216 to move lens 210 in a positive displacement direction. At each data layer, i.e., data layers 51, 62, 71, 82 of disks 50, 60, 70, 80, respectively, peak detector 310 will detect the two peaks of the FES when the focal spot of beam 204 passes through the data surface and the substrate aberrations are properly compensated. Controller 314 counts the peaks and determines the exact data surface on which beam 204 is focused. When the desired surfaces are reached, controller 314 causes motor 216 to position lens 210 such that the focus error signal is between the two peaks for that particular data surface. The focus error is then used to control the motor 216 to seek the zero point focus error signal between the peaks, i.e., lock on the positive slope signal such that exact focus is achieved. The controller 314 will also adjust the power of laser 200 for that particular data surface.

Figure 5:
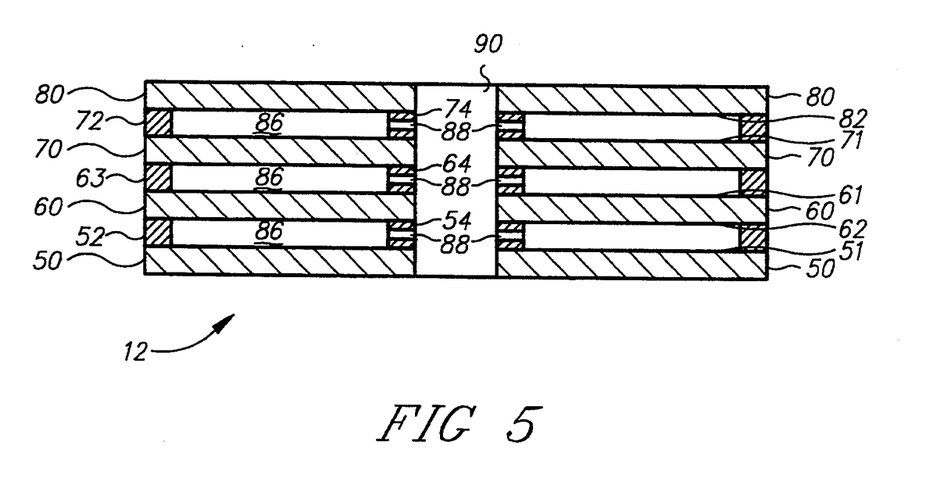
FIG. 5 is a sectional view of the optical medium illustrating the various disk substrates and their data layers.

FIG. 5 is a cross-sectional view of the preferred embodiment of optical medium 12 for use in a CD-ROM system. Medium 12 includes four disk substrates 50, 60, 70, and 80. Substrate 50 is the substrate closest to the optical head 22 (FIG. 1) and is where the laser beam enters medium 12. An outer diameter (OD) rim 52 and an inner diameter (ID) rim 54 are attached between substrate 50 and adjacent substrate 60. An OD rim 63 and an ID rim 64 are attached between substrate 60 and adjacent substrate 70, and an OD rim 72 and an ID rim 74 are attached between adjacent substrates 70 and 80. Substrates 50, 60, 70, and 80 are made of a light-transmissive material such as glass, polycarbonate, or other polymer material. The ID and OD rims are also preferably made of a plastic material, such as polycarbonate.

The rims may be attached to the substrates by means of glue, cement, or other bonding process. However, preferably the rims are integrally formed in the substrates during fabrication, such as in the conventional injection molding process for polycarbonate CD-ROM substrates. When in place, the rims form a plurality of annular spaces 86 between the substrates and the face plate. A spindle aperture 90 passes through medium 12 inside the ID rims for receiving the spindle 14. A plurality of passages 88 are provided in the ID rims connecting the aperture and the spaces 86 to allow pressure equalization between the spaces 86 and the surrounding environment of the disk drive, which would typically be air. The passages 88 could alternatively be located on the OD rims.

Figure 6:
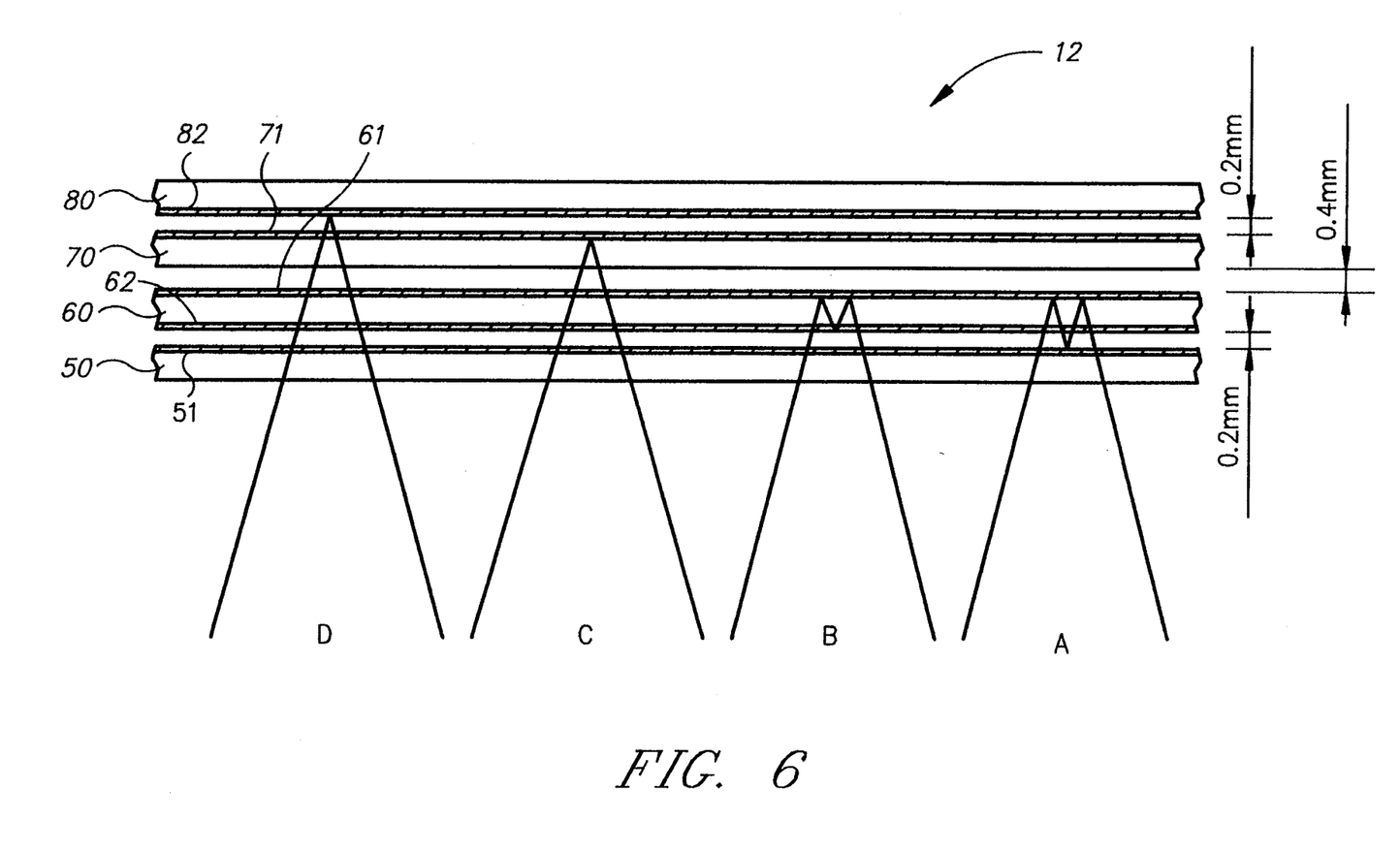
FIG. 6 is a sectional view of the preferred embodiment of the optical medium illustrating the light being focused to the different data layers.

Referring now to FIG. 6, there is illustrated a schematic of a partial section of the preferred embodiment of the optical medium 12 showing representative optical paths A–D being focused to the respective reflective data layers of the disk substrates. In the preferred embodiment, each of the disk substrates is of the same thickness, preferably approximately 0.4 mm, and is formed of conventional polycarbonate CD-ROM material. Each of the data layers (51 on substrate 50, 62 on substrate 60, 71 on substrate 70, and 82 on substrate 80) is a read-only data layer as used in CD-ROM disks, i.e., an embossed pattern of pits. Layer 61 on substrate 60 is a partially transmissive layer with no data. However, the data layers are formed to be partially transmissive and to have different reflectivities, as will be explained.

The spacing of the substrates is selected such that the locations of the virtual images, e.g., the points where optical paths A and B would be focused if they were not reflected by layer 61, are not in close proximity to other data layers. If these virtual images are too close to data layer 71 on substrate 70 or data layer 82 on substrate 80, crosstalk will occur in the read signal. One embodiment of FIG. 6 that achieves both low crosstalk and minimal overall thickness for medium 12 is a structure with the spacing between substrates 50 and 60 set at approximately 0.2 mm, the spacing between substrates 70 and 80 also set at 0.2 mm, and the spacing between substrates 60 and 70 set at twice that distance, i.e., 0.4 mm.

As illustrated in FIG. 6, each of the optical paths A–D has a unique length, each length being determined by the focusing position of lens 210, which is controlled by lens focusing motor 216 (FIG. 2). For example, in the case of optical path A, the laser beam is focused to data layer 51 on substrate 50 by passing through, in succession, (a) the light-transmissive substrate 50, (b) the partially transmissive data layer 51 on substrate 50, (c) the air space between substrates 50 and 60, (d) the partially transmissive data layer 62 on substrate 60, (e) twice through substrate 60 due to reflection from partially transmissive face 61, (f) again through partially transmissive data layer 62 on substrate 60, and (g) again through the air space between substrates 50 and 60.

Thus, the optical path length A includes the distance from the focusing lens to substrate 50, plus three times the substrate thickness and two times the spacing distance between substrates 50 and 60.

Referring now to optical path B, in order to focus upon data layer 62 on substrate 60, the laser beam must pass through substrate 50 once and substrate 60 twice (being reflected off of partially transmissive face 61). The total optical path length B thus differs from that of A by one spacing distance between substrates 50 and 60. However, in both optical path lengths A and B, the optical path length includes passage of the light through a total of three substrate thicknesses.

In order to focus on data layer 71 on substrate 70, as shown by optical path C, light must pass once through each of substrates 50, 60, and 70. Similarly, the length of optical path D to data layer 82 on the fourth substrate 80 is the same as that of optical path C plus the spacing distance between substrates 70 and 80.

In each of the unique optical path lengths A-D, the length includes passage of the light through the same amount of substrate, namely a distance equal to three substrate thicknesses. Because the light in each of these unique optical paths is focused to different points but through the same amount and type of substrate material, and because the spacing gaps are air which has an index of refraction of 1.0, there is no need for a variable aberration corrector in the optical data system. That is, the fixed spherical aberration correction of the focusing lens 210 (FIG. 2) can be set to accommodate a fixed total substrate thickness (1.2 mm) and should be adequate for focusing to all four data layers.

The reflected intensities $S_A$-$S_D$ for light reflected from the data layers corresponding to each of the optical path lengths A-D, respectively, in the embodiment of FIG. 6 can be represented in the general case as follows, where R and T represent the reflectivity and transmissivity of the respective interfaces of each of the substrates, with face 1 being the face closest to the optical head (the opposite face to data layer 51 on substrate 50) and face 7 being that farthest from the optical head (data layer 82 on substrate 80):

$$S_A = N*(R_4*T_3)^2*R_2 \quad (1)$$

$$S_B = N*(R_4)^2*R_3 \quad (2)$$

$$S_C = N*(T_4*T_5)^2*R_6 \quad (3)$$

$$S_D = N*(T_4*T_5*T_6)^2*R_7 \quad (4)$$

where $$N = (T_1*T_2*T_3)^2. \quad (5)$$

By setting the reflectivity of the 7th interface (data layer 82 on substrate 80) at 100% and constraining the reflected intensities $S_A$-$S_D$ to be equal, then an effective reflected intensity for each of the optical paths A-D of 2.7% is possible with reflectivities of the individual data layers given as follows:

$R_2 = 14$
$R_3 = 11$
$R_4 = 65$
$R_6 = 38$ assuming $T=(1-R)$, i.e., the absorption of the data layers is zero. A key advantage of setting the effective reflective intensity to be essentially constant, regardless of which data layer is being accessed, is that there is no need for variable amplification of the output from detector 234 (FIG. 2) and the fixed signal amplification provided by amplifier 236 (FIG. 3) will be sufficient.

Figure 7:
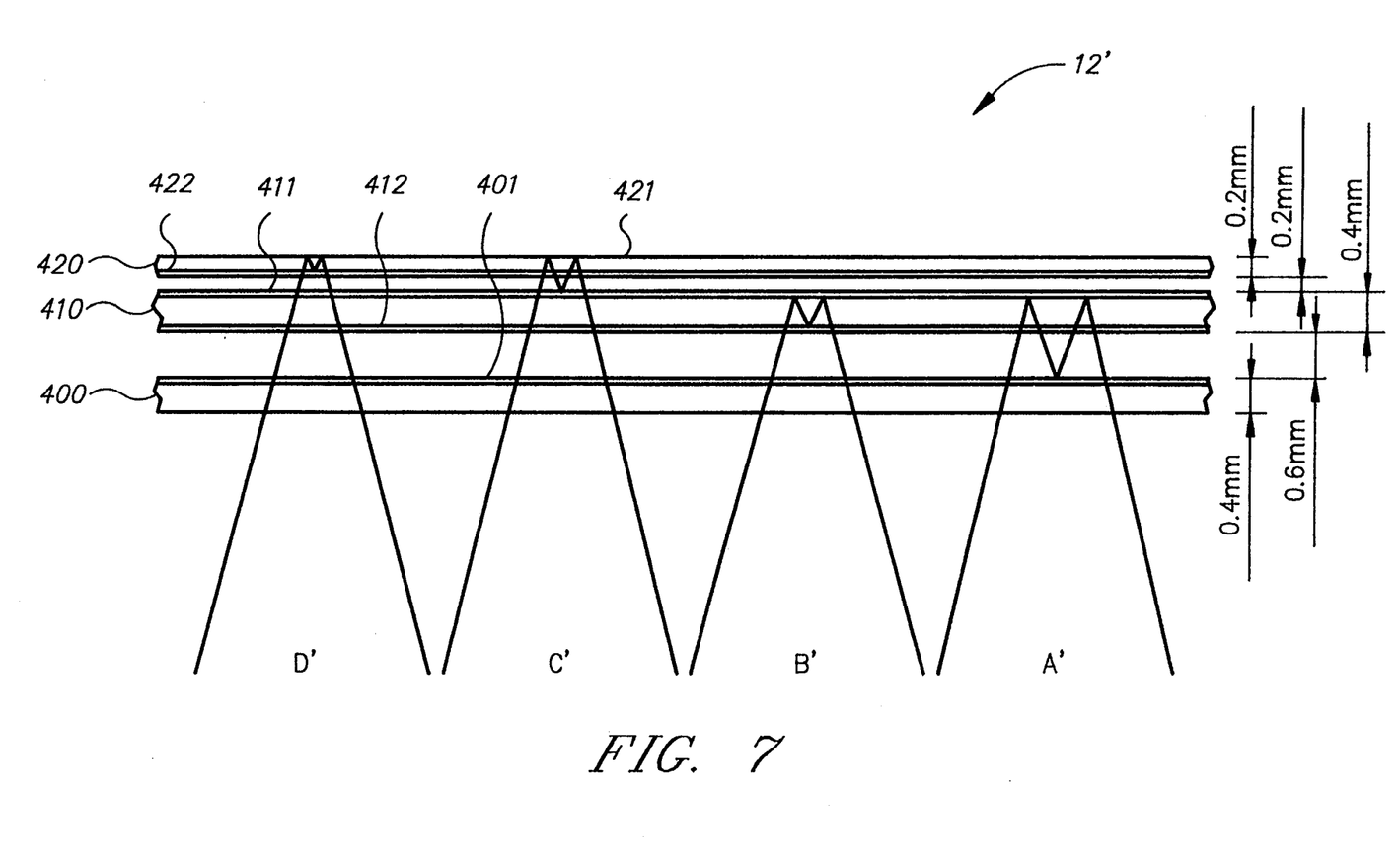
FIG. 7 is a sectional view of an alternative embodiment of the optical medium illustrating the light being focused to the different data layers.

Referring now to FIG. 7, there is shown an alternative embodiment of the optical medium, designated 12', which is a three-disk substrate system providing four data layers. Substrates 400 and 410 are of the same thickness (0.4 mm) and are spaced apart 0.6 mm. The third substrate, substrate 420 farthest from the optical head, has a thickness one half that of substrates 400, 410, i.e., 0.2 mm, and is spaced apart from its adjacent substrate 410 by a distance one-third of the spacing between the first and second substrates.

Substrate 400 has a data layer 401 on its face away from the optical head, substrate 410 has data layers on both of its faces 412, 411, and substrate 420 has a data layer 422 on its face facing substrate 410. As can be understood by reference to the graphical representations of the respective optical paths A'-D' to the respective data layers 401, 412, 411, and 422, the optical paths have unique lengths corresponding to unique positions of the focusing lens. However, the total amount of substrate material through which the light passes in each of the optical paths A'-D' is the same. This distance is three times the thickness of substrate 400, or approximately 1.2 mm. Optical paths A' and B' pass once through substrate 400 and twice through substrate 410 for a total of approximately 1.2 mm. Optical paths C' and D' pass once through substrates 400 and 410 and twice through substrate 420 for a total of approximately 1.2 mm. The difference between the lengths of optical paths A', B', C', and D' is simply the spacing distance between disk substrates 400, 410, and 420. However, since this space is air, with an index of refraction of 1.0, it has no effect on aberration. As indicated for the embodiment of FIG. 6, the spacing between the disks is selected so that there is minimal crosstalk caused by closeness of the virtual images to the data layers. The actual selected spacing distances in the embodiment of FIG. 7 result in just one embodiment that achieves both low crosstalk and minimal overall thickness for the medium 12'. As is apparent from FIG. 7, the face 421 on the third and farthest substrate 420 is a totally reflective layer which contains no data but is needed to reflect light for each of the optical paths C' and D'.

The reflected intensities from optical paths A'-D' can be represented as follows, where again subscripts 1-6 refer to substrate interfaces commencing with interface 1 closest to the optical head:

$$S_{A'} = N*(R_4*T_3)^2*R_2 \quad (6)$$

$$S_{B'} = N*(R_4)^2*R_3 \quad (7)$$

$$S_{C'} = N*(T_4*T_5^2*R_6)^2*R_4 \quad (8)$$

$$S_{D'} = N*(T_4*T_5*R_6)^2*R_5 \quad (9)$$

where $$N = (T_1*T_2*T_3)^2. \quad (5)$$

By setting the reflectivity of the 6th interface (reflective layer 421 on substrate 420) at 100% and constraining the reflected intensities to be equal, then an effective reflected intensity of 1.7% is possible for each of the optical paths A'-D' with reflectivities of the individual data layers given as follows:

$R_2 = 13$
$R_3 = 10$ $R_4 = 56$
$R_5 = 29$
again assuming $T = (1 - R)$.

In the fabrication of the CD-ROM disks represented by the optical mediums in FIGS. 6 and 7, the data layers are formed by conventional injection molding, embossing, or photopolymer replication. The data layers can then be made to the selected varying reflectivities by use of various conventional metallic (e.g., Al, Au) layers, semiconductor material (e.g., amorphous Si, GaSb) layers, or dielectric (e.g., $ZrO_2$, SiN) layers. These materials can be deposited by sputtering or evaporation, as is known in the art.

In both embodiments of FIGS. 6 and 7, the reflectivities of the data layers were selected such that the effective reflected intensity for each of the optical paths was the same. As described, this eliminated the need for a variable signal amplifier. However, if it is desired to have different effective reflected intensities for the different optical paths, then the amplifier 236 (FIG. 3) would have to be a variable amplifier with its level controlled by controller 314 and selected according to which data layer was being accessed.

While the preferred embodiments of the present invention have been illustrated in detail, it should be apparent that modifications and improvements may be made to the invention without departing from the spirit and scope of the invention as described in the following claims.

What is claimed is:

1. An optical data storage system comprising:
    an optical medium comprising two spaced-apart substrates having substantially the same material thickness, each substrate having a data layer, at least one of the substrates having a data layer which is at least partially transmissive;
    a light source located near a first one of the substrates;
    means for directing light from the source to the medium, the light directing means including means for focusing the light to a discrete number of focusing positions, each position defining an optical path between the light source and a corresponding one of the data layers, each of the two optical paths including passage through substrate material having a total thickness substantially equal to three substrate thicknesses.

2. The system according to claim 1 further comprising means responsive to the light reflected from the data layers for providing a data signal.

3. The system according to claim 2 wherein the means for providing a data signal includes means for detecting the intensity of the light reflected from the data layers and means coupled to the detecting means for amplifying the detected intensity.

4. The system according to claim 1 further comprising a third substrate having a data layer and being of substantially the same thickness as the first and second substrates, the third substrate being adjacent to and spaced from the second substrate, and wherein the optical path to the data layer on the third substrate includes passage through substrate material having a total thickness substantially equal to three substrate thicknesses.

5. The system according to claim 1 further comprising a fourth substrate adjacent to and spaced from the third substrate and having a data layer facing the third substrate, and wherein the optical path to the data layer on the fourth substrate includes a single passage through each of the first three substrates.

6. The system according to claim 1 further comprising a third substrate adjacent to and spaced from the second substrate and having a thickness t/2 and a data layer facing the second substrate, and wherein the first substrate has a thickness t and a data layer on its face farthest from the light source; the second substrate has a thickness t and data layers on both its faces; and the optical paths for each of the four data layers include passage through substrate material having a total thickness of 3t.

7. The system according to claim 6 wherein the third substrate has a nondata reflecting layer on its face opposite its data layer for reflecting light to at least one of the data layers.

8. The system according to claim 1 wherein each of the substrates is formed of essentially polycarbonate and wherein the data layers on the substrates are read-only data layers.

9. The system according to claim 1 wherein the reflective data layers comprise essentially amorphous silicon.

10. The system according to claim 1 wherein the reflective data layers comprise essentially aluminum.

11. The system according to claim 1 wherein each of the data layers has a predetermined value of reflectivity, whereby the effective reflected light intensity is substantially the same for each of the optical path lengths.

12. An optical recording medium comprising:
    two light-transmissive disk substrates of substantially the same thickness supported in a stack with the disk substrates parallel to and spaced apart from one another; a first of the substrates having an outer face and an inner face with a partially transmissive data layer the second substrate having an inner face with a partially transmissive data layer facing the inner face of the first substrate and an outer face with a data layer for reflecting light to the inner data layer on the second substrate and to the inner data layer on the first substrate.

13. The medium according to claim 12 wherein the first and second substrates have a thickness t, and further comprising a third substrate having a thickness t/2, the third substrate being adjacent to and spaced from the second substrate and having a partially transmissive data layer on its face facing the second substrate and a nondata reflecting layer on its other face for reflecting light to other data layers in the medium.

14. The medium according to claim 12 wherein each of the substrates is formed of essentially polycarbonate and wherein the data layers on the substrates are read-only data layers.

15. The medium according to claim 12 wherein the reflective data layers comprise essentially amorphous silicon.

16. The medium according to claim 12 wherein the reflective data layers comprise essentially aluminum.

* * * * *

UNITED STATES PATENT AND TRADEMARK OFFICE
CERTIFICATE OF CORRECTION

PATENT NO.   :   5,373,499
DATED        :   December 13, 1994
INVENTOR(S)  :   Wayne I. Imaino et al.

It is certified that error appears in the above-identified patent and that said Letters Patent is hereby corrected as shown below:

Title page item, [54] and col. 1,

In the title, between "PATHS" AND "INCLUDE", insert --THAT--.

Claim 12, col. 8, line 40, after "layer" insert a semicolon (;).

Signed and Sealed this

Third Day of October, 1995

Attest:

BRUCE LEHMAN

Attesting Officer         Commissioner of Patents and Trademarks